(12) United States Patent
Ogawa et al.

(10) Patent No.: US 10,562,471 B2
(45) Date of Patent: Feb. 18, 2020

(54) GROMMET

(71) Applicant: Yazaki Corporation, Tokyo (JP)

(72) Inventors: Masayoshi Ogawa, Toyota (JP);
Satoshi Yokoyama, Toyota (JP);
Shinichi Ikeda, Toyota (JP)

(73) Assignee: YAZAKI CORPORATION,
Minato-ku, Tokyo (JP)

( * ) Notice: Subject to any disclaimer, the term of this patent is extended or adjusted under 35 U.S.C. 154(b) by 0 days.

(21) Appl. No.: 16/113,030

(22) Filed: Aug. 27, 2018

(65) Prior Publication Data

US 2019/0111867 A1 Apr. 18, 2019

(30) Foreign Application Priority Data

Oct. 13, 2017 (JP) .................. 2017-199457

(51) Int. Cl.
*H02G 3/22* (2006.01)
*B60R 16/02* (2006.01)
*H02G 3/04* (2006.01)

(52) U.S. Cl.
CPC ....... *B60R 16/0222* (2013.01); *H02G 3/0468* (2013.01); *H02G 3/22* (2013.01)

(58) Field of Classification Search
CPC .......... H02G 3/0468; H02G 3/22; H02G 3/04; H02G 3/30; H02G 3/36; H02G 3/0406; H02G 3/24; H02G 3/26; B60R 16/02; B60R 16/0222; B60R 16/0207; B60R 16/0215; H01B 17/58; H01B 17/583; H01B 17/586; F16L 5/02; F16L 5/00
USPC .... 174/650, 152 R, 152 G, 153 G, 135, 142, 174/137 R, 151, 17 CT, 138 R; 439/587, 439/271, 272, 273, 274, 275; 16/2.1, 2.2; 248/56
See application file for complete search history.

(56) References Cited

U.S. PATENT DOCUMENTS

| | | | | |
|---|---|---|---|---|
| 4,928,349 | A * | 5/1990 | Oikawa ................. | H02G 3/083 174/153 G |
| 4,945,193 | A * | 7/1990 | Oikawa ............... | H02G 3/0625 174/153 G |
| 5,300,734 | A * | 4/1994 | Suzuki .................. | H01R 13/56 174/135 |
| 6,901,627 | B2 * | 6/2005 | Uchida ............... | B60R 16/0222 174/135 |
| 7,020,931 | B1 * | 4/2006 | Burnett ............... | B60R 16/0222 174/153 G |

(Continued)

FOREIGN PATENT DOCUMENTS

| JP | 2014-033564 A | 2/2014 |
|---|---|---|
| JP | 2014-138519 A | 7/2014 |
| JP | 2015-198557 A | 11/2015 |

*Primary Examiner* — Angel R Estrada
(74) *Attorney, Agent, or Firm* — Sughrue Mion, PLLC

(57) ABSTRACT

A grommet which can prevent unintended deformation of an annular lip portion is provided. The annular lip portion is configured to be compressed in a compression direction corresponding to a direction perpendicular to a plane of a panel member. Thus, even if the annular lip portion is formed with a large length to ensure a pushing force against a planar portion, a tip edge of the annular lip portion is unlikely to be located in the vicinity of a first flange portion. Therefore, the annular lip portion is avoided from contacting the other members, preventing unintended deformation of the annular lip portion.

8 Claims, 5 Drawing Sheets

(56) References Cited

U.S. PATENT DOCUMENTS

| | | | |
|---|---|---|---|
| 8,816,210 B2* | 8/2014 | Yoshimura | B60R 16/0222 174/153 G |
| 8,975,524 B2* | 3/2015 | Kanai (Popovici) | B60R 16/0222 174/153 G |
| 2014/0196931 A1 | 7/2014 | Fujita et al. | |
| 2015/0144378 A1* | 5/2015 | Asayama | B60R 16/0222 174/152 G |

* cited by examiner

GROMMET

CROSS REFERENCE TO RELATED APPLICATION

The priority application Japanese Patent Application No. 2017-199457 upon which this patent application is based is hereby incorporated by reference.

FIELD OF THE INVENTION

The present invention relates to a grommet configured to be attached to an attachment hole of a panel member.

BACKGROUND OF THE INVENTION

When mounting an electric wire to a vehicle door and such to feed electric power, a grommet may be used to protect the electric wire from water. For a vehicle with a sprung type back door, for example, one end of the grommet covering the electric wire may be attached to a vehicle body-side panel member, while the other end of the grommet may be attached to a door-side panel member, in the vicinity of a hinged portion of the back door.

In a known example of such grommet, a flange portion that faces the panel member and an annular lip portion that contacts with an opening edge (planar portion) of the attachment hole, are arranged to abut each other, as described in Japanese Patent Application Publication No. 2014-33564 (hereinafter called "JP'564"). In the grommet described in JP'564, the annular lip portion and the flange portion abut each other, and the annular lip portion is sandwiched between the flange portion and the panel member, thereby making the annular lip portion pushed hardly against the opening edge.

SUMMARY OF THE INVENTION

However, the grommet described in JP'564 has a drawback as described below. That is, the length of the annular lip portion needs to be long to ensure the adequate pushing force of the annular lip portion with respect to the opening edge, and thus the tip edge of the annular lip portion is located in the vicinity of the outer edge of the flange portion. Thus, when storing the grommets before the attachment to the panel member, the annular lip portion may contact with other members. Specifically, when such grommet is placed on a placement surface so that its opening faces in the horizontal direction, the annular lip portion is likely to contact with the placement surface. Since the annular lip portion is formed to be easily deformable, it is possible that the annular lip portion is unintentionally deformed upon the contact with the other members.

An object of the present invention is to provide a grommet which can prevent unintended deformation of an annular lip portion.

The present invention provides a grommet formed into a tubular shape so as to cover an electric wire and configured to be attached to an attachment hole of a panel member, the grommet including: a first flange portion formed so as to face the panel member; and an annular lip portion extending from an inner peripheral part of the first flange portion toward the panel member so as to elastically contact with a planar portion around the attachment hole, wherein the annular lip portion extends in entirety in a direction perpendicular to a plane of the panel member so as to deform in a compression direction corresponding to the direction perpendicular to the plane of the panel member during the elastic contact.

According to the grommet of the present invention, the annular lip portion is configured to be compressed in a compression direction corresponding to the direction perpendicular to the plane of the panel member. Thus, even if the annular lip portion is formed with a large length to ensure the sufficient pushing force against the planar portion, the tip edge of the annular lip portion is unlikely to be located in the vicinity of the first flange portion. Therefore, the annular lip portion is avoided from contacting the other members, preventing unintended deformation of the annular lip portion.

DETAILED DESCRIPTION OF EXEMPLARY EMBODIMENT OF THE INVENTION

Figure 1:
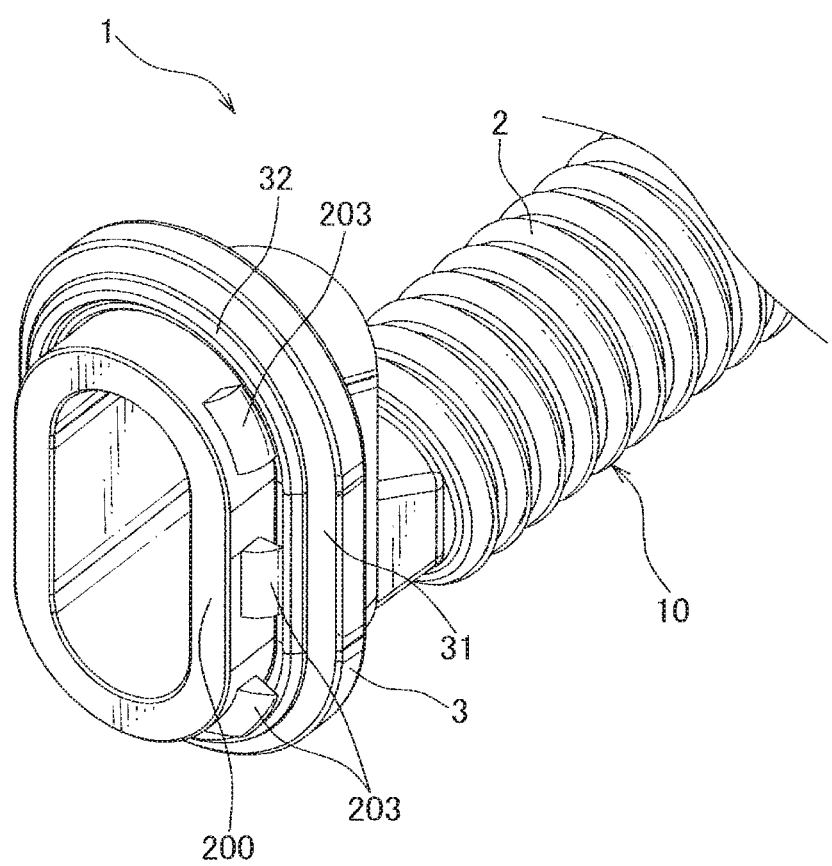
FIG. 1 is a perspective view of a grommet according to an embodiment of the present invention.
Figure 2:
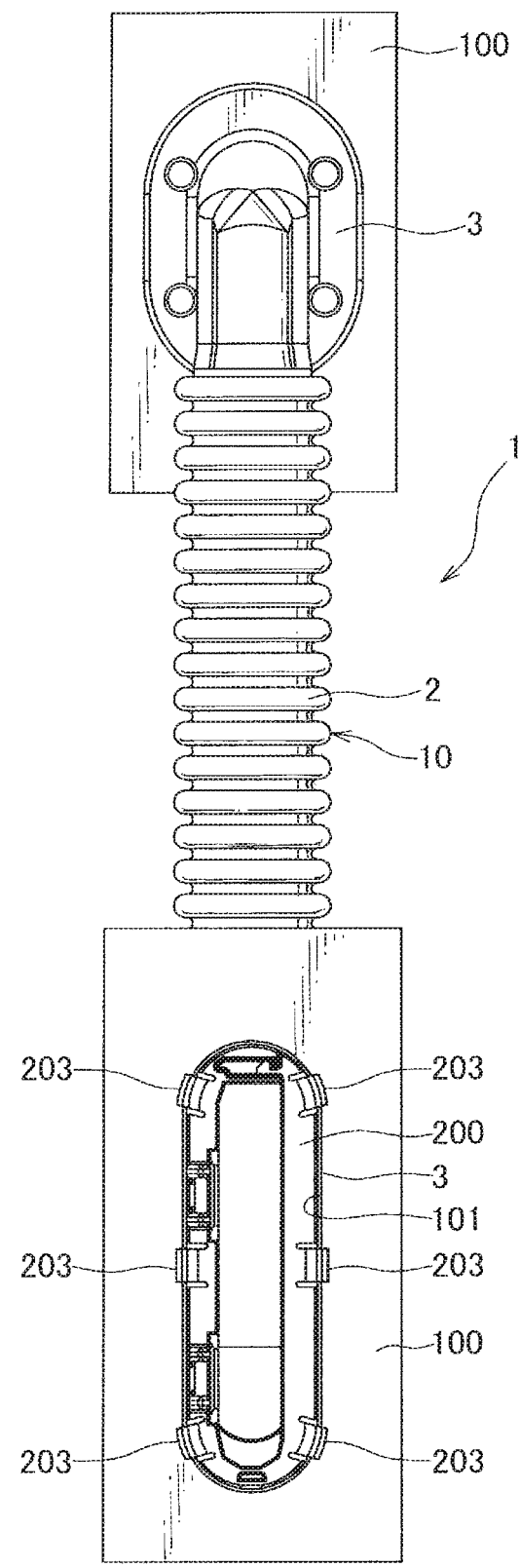
FIG. 2 is a plan view of the grommet.
Figure 3:
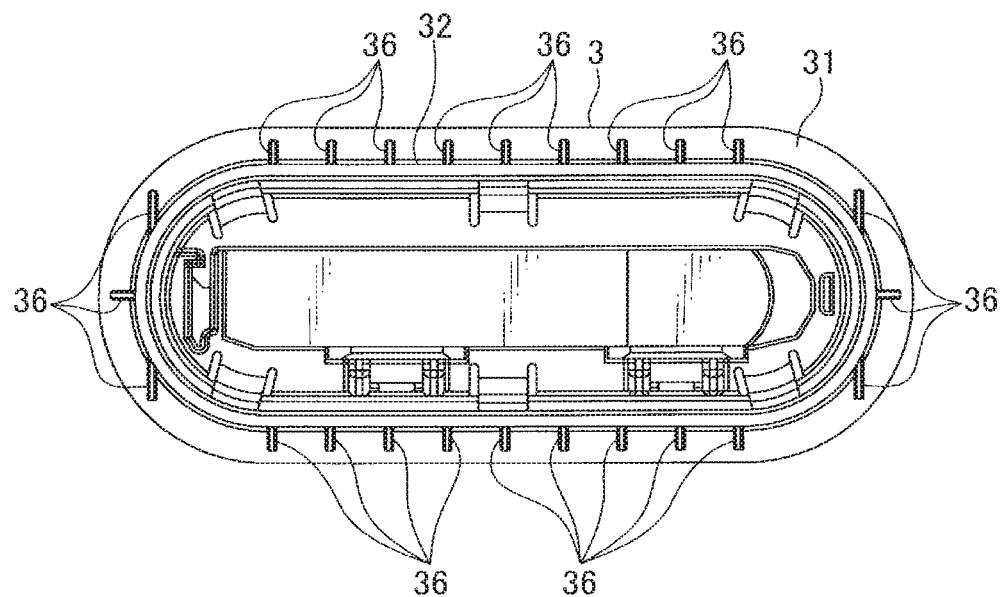
FIG. 3 is a plan view of an attachment section of the grommet.
Figure 4:
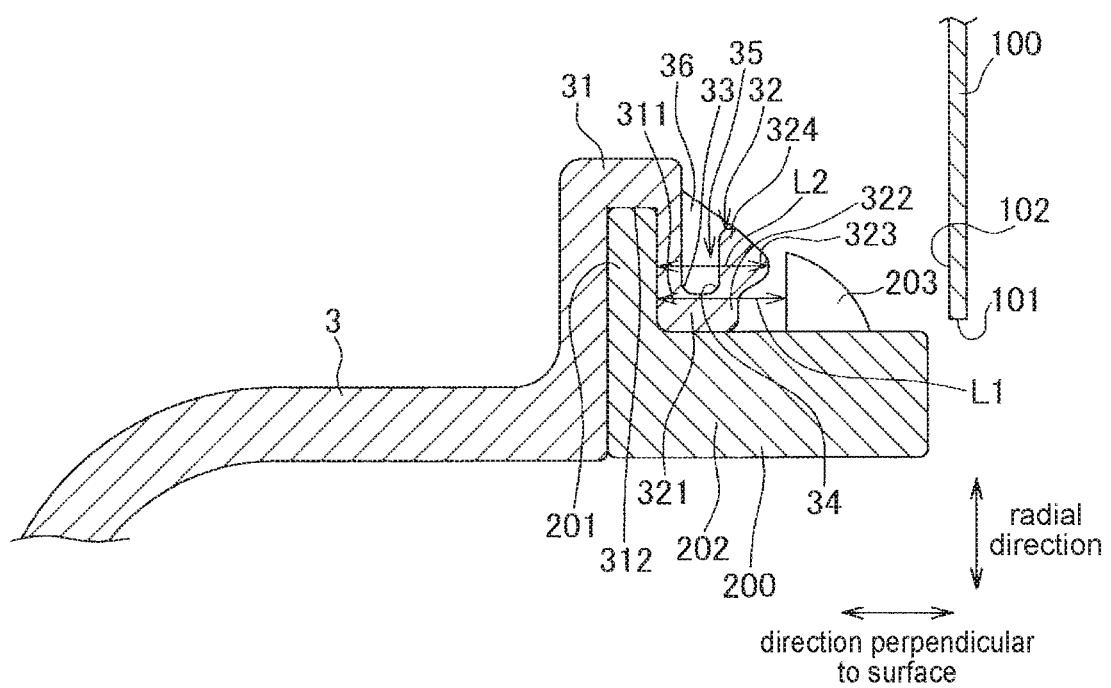
FIG. 4 is a cross-sectional view of a portion of the grommet.
Figure 5:
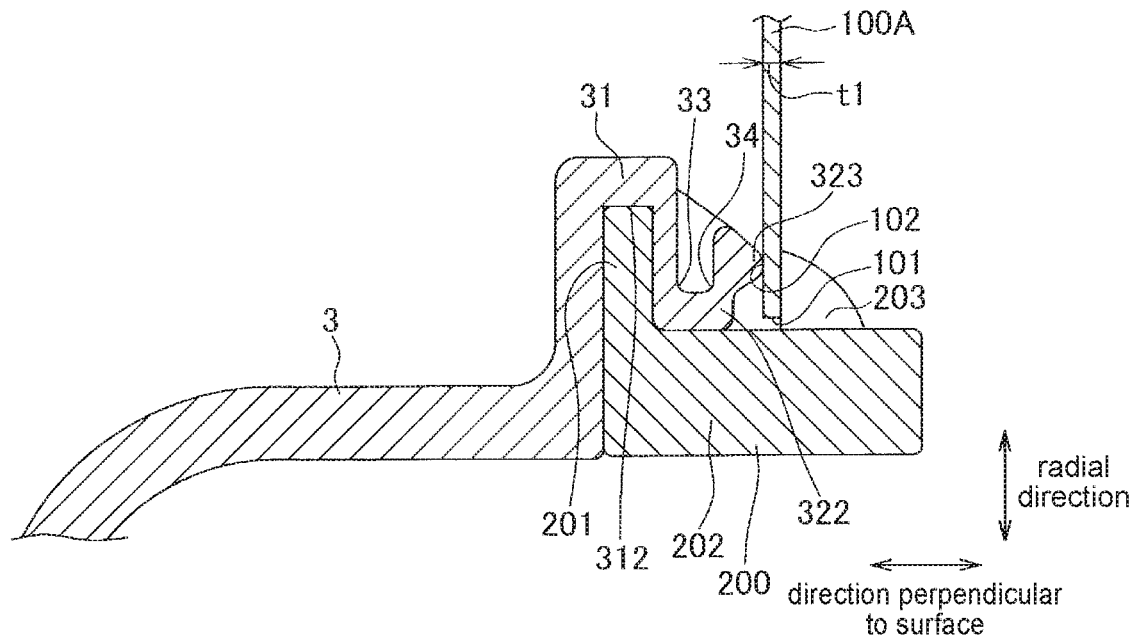
FIG. 5 is a cross-sectional view of the grommet attached to a panel member.
Figure 6:
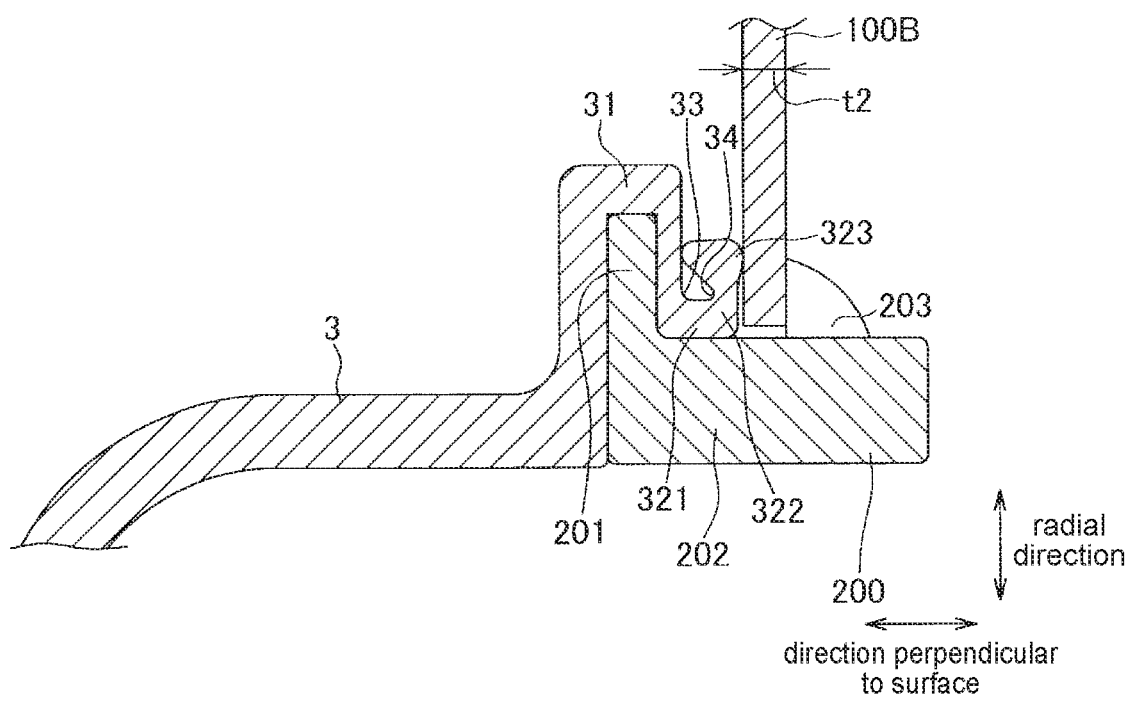
FIG. 6 is a cross-sectional view of the grommet attached to another panel member.
Figure 7:
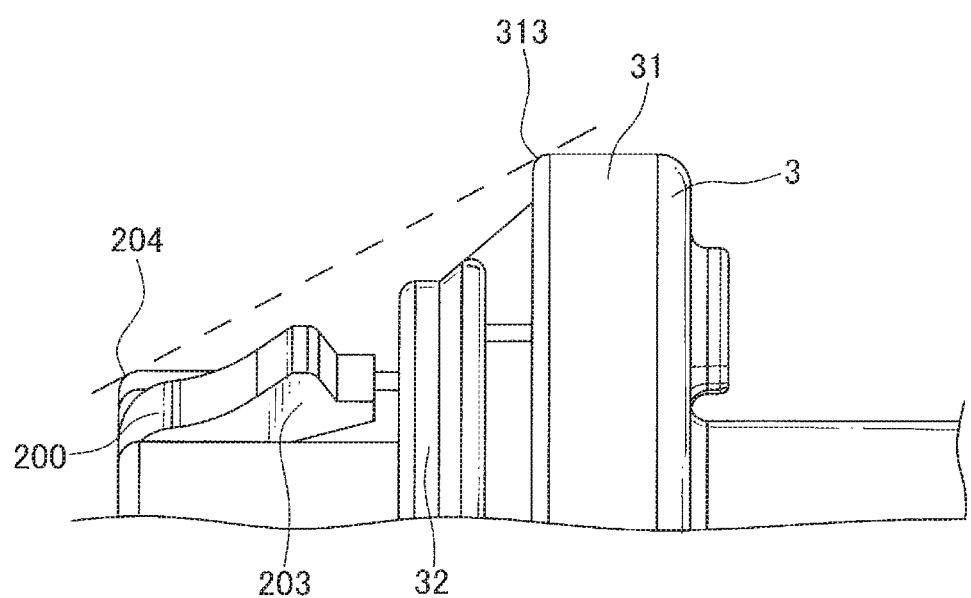
FIG. 7 is a side view of a portion of the grommet.

An embodiment of the present invention is hereinafter described with reference to the drawings. FIG. 1 is a perspective view of a grommet 1 according to the embodiment of the present invention. FIG. 2 is a plan view of the grommet 1. FIG. 3 is a plan view of an attachment section 3 of the grommet 1. FIG. 4 is a cross-sectional view of a portion of the grommet 1. FIG. 5 is a cross-sectional view of the grommet 1 attached to a panel member 100A. FIG. 6 is a cross-sectional view of the grommet 1 attached to another panel member 100B. FIG. 7 is a side view of a portion of the grommet 1.

As illustrated in FIGS. 1 to 3, the grommet 1 according to this embodiment is formed into a tubular shape so as to cover an electric wire and is configured to be attached to an attachment hole 101 of a panel member 100. The grommet 1 is configured to be mounted to a vehicle with a sprung type back door in the vicinity of a hinged portion of the back door, for example. The grommet 1 includes a grommet body 10 and an inner member 200. The grommet body 10 includes a corrugated tube portion 2 through which an electric wire is to be inserted, and attachment sections 3 to be attached to the panel member. The corrugated tube portion 2 and the attachment sections 3 are made of a soft resin and are formed integral with one another. The attachment sections 3 are formed at both ends of the corrugated tube portion 2 and are configured to be attached for example to a vehicle-side panel member and a door-side panel member, respectively. In this embodiment, the two attachment sections 3 are similar in constitution.

The corrugated tube portion 2 are formed into bellows and is bendable, extendable and shrinkable. Thus, the corrugated tube portion 2 is deformed accordingly in accordance with the opening and closing of the back door.

The attachment section 3 has a tubular shape with an opening on a side closer to the panel member 100, and has an oval shape in a view from the side of the panel member 100. As illustrated in FIG. 4, the attachment section 3 has, on its opening side, a first flange portion 31 configured to face the panel member 100, and an annular lip portion 32 continuous with an inner peripheral part 311 of the first flange portion 31 and extending toward the panel member 100.

The first flange portion 31 is a portion with a diameter greater than other parts of the attachment section 3, and is formed into a flange shape that follows the panel member 100. A concave shaped inner member housing 312 is formed on an inner-diameter side of the first flange portion 31. The inner member housing 312 is configured to house a later-described flange portion 201 of the inner member 200.

The inner member 200 is disposed on the radially inner side of the attachment section 3 of the grommet 1, and is configured to pass an electric wire therethrough. The inner member 200 is made of a resin having a higher degree of hardness than the material of the grommet 1. The inner member 200 has a flange portion 201, a tubular portion 202, and engaging portions 203, which are arranged in this order in a direction from the grommet 1 toward the panel member 100.

The flange portion 201 is greater in diameter than the attachment hole 101 and is configured to face the panel member 100. By housing the flange portion 201 in the inner member housing 312, the inner member 200 is attached to the attachment section 3. The tubular portion 202 has a diameter smaller than that of the attachment hole 101 so as to be insertable in the attachment hole 101. The engaging portions 203 are each inclined so as to reduce its diameter toward its tip end side, while the outermost diameter of the engaging portions 203 is greater than the inner diameter of the attachment hole 101. Thus, by inserting the engaging portions 203 in the attachment hole 101, the engaging portions 203 are engaged with an inner surface of the panel member 100 (i.e., a surface on the opposite side of the grommet body 10).

As described above, the grommet 1 includes the inner member 200 by which the grommet 1 is attached to the panel member 100. Further, a portion of the grommet body 10 and a portion of the panel member 100 around the attachment hole 101 are sandwiched between the flange portion 201 and the engaging portions 203.

The annular lip portion 32 elastically contacts the planar portion 102 of the panel 100 around the attachment hole 101 to ensure water tightness. The annular lip portion 32 has a tubular portion 321 continuous with the inner peripheral part 311 of the first flange portion 31, a second flange portion 322 continuous with a tip end of the tubular portion 321, and a protruding portion 323 protruding from the second flange portion 322.

The tubular portion 321 is formed into a tubular shape extending along an extending direction corresponding to the direction perpendicular to the plane of the panel member 100. The second flange portion 322 is extending radially outward from the tubular portion 321 and is extending substantially parallel to the panel member 100. The protruding portion 323 is protruding toward the planar portion 102. The second flange portion 322 is provide with a flange protrusion 324 protruding more radially outward than the protruding portion 323.

The first flange portion 31 is extending substantially parallel to the panel member 100, while the tubular portion 321 is extending substantially perpendicularly with respect to the panel member 100. Accordingly, a substantially right-angled first bending portion 33 is formed between first flange portion 31 and the tubular portion 321. The tubular portion 321 is extending substantially perpendicularly with respect to the panel member 100, while the second flange portion 322 is extending substantially parallel to the panel member 100. Accordingly, a substantially right-angled second bending portion 34 is formed between the tubular portion 321 and the second flange portion 322.

In the attachment section 3, the first flange portion 31, tubular portion 321 and second flange portion 322 together form an outer-side concave portion 35 having a concave outer surface. The second flange portion 322 has a radial dimension smaller than the depth of the inner member housing 312 of the first flange portion 31. Thus, the tip end of the protruding portion 323 (i.e., a portion that contacts with the planar portion 102) is located more radially inward than the bottom portion of the inner member housing 312. A radially outer edge of the flange portion 201 of the inner member 200 is configured to abut on the bottom portion of the inner member housing 312, such that the tip end of the protruding portion 323 overlaps with the flange portion 201 in a view along the direction perpendicular to the plane of the panel member 100. The protruding portion 323 is restricted from moving radially outward as described later, thus the annular lip portion 32 abuts on the planar portion 102 at a location more radially inward than the outer peripheral edge of the flange portion 201.

The attachment section 3 has a plurality of ribs 36 that interconnect the annular lip portion 32 and the first flange portion 31. The ribs 36 are spaced at predetermined intervals along the opening of the attachment section 3. The ribs 36 are extending slantwise from a radially outer end of the second flange portion 322 and are directed more radially outward and connected to the first flange portion 31. As described later, when the annular lip portion 32 are deformed, the ribs 36 are also deformed.

The tip end of the flange protrusion 324 corresponds to the tip edge of the entire annular lip portion 32. As illustrated in FIG. 7, the tip edge of the annular lip portion 32 is located more inward than a virtual straight line connecting an outer edge 313 of the first flange portion 31 on the panel member 100 side with an outer edge 204 of the inner member 200. Thus, when the attachment section 3 is horizontally placed on a suitable placement surface (i.e., placed so that its opening faces the horizontal direction), the tip edge of the annular lip portion 32 does not contact with the placement surface even if the attachment section 3 is slanted relative to the placement surface.

In the following, the deformation of the annular lip portion 32 during the attachment of the grommet 1 to the panel member 100 is described. First, referring to FIG. 4, the case of the use of a panel member 100A is described. The panel member 100A is configured such that the sum of a dimension L2, which is a dimension of the attachment section 3 between the flange portion 201 and the engaging portion 203, and a thickness t1, which is the thickness of the panel member, is slightly greater than an interval L1 between the flange portion 201 and the engaging portion 203 in the direction perpendicular to the plane of the panel member. When the engaging portions 203 are engaged with the panel member 100A, the tip end of the protruding portion 323 of the annular lip portion 32 abuts on the planar portion 102, with the attachment section 3 being almost not deformed.

Next, referring to FIG. 5, the case of the use of a panel member 100B is described. The panel member 100B is configured such that the sum of the dimension L2 and a thickness t2 of this panel member is even more greater than the interval L1. When the engaging portions 203 are engaged with the panel member 100B, the tip end of the protruding portion 323 of the annular lip portion 32 abuts on the planar portion 102. At this time, the attachment section 3 is deformed, because the respective elements have the dimensional relationship as described above and the material of the grommet 1 is softer than the panel member 100B and the inner member 200.

Specifically, as the second flange portion 322 is moved toward the first flange portion 31, the second bending portion 34 is bent and thereby acutely angled. At this time, the outer-side concave portion 35 provides a space for the movement of the second flange portion 322. Such deformation causes the protruding portion 323 to move along an arc centered on the second bending portion 34, i.e., the protruding portion 323 is thereby moved toward the first flange portion 31 in the direction perpendicular to the plane of the panel member and is also moved radially inward. Then, the protruding portion 323 of the annular lip portion 32 abuts on the planar portion 102, as with the case illustrated in FIG. 4.

As described above, when the annular lip portion 32 elastically contacts the planar portion 102 of the panel member 100 and thereby deforms, the protruding portion 323 abutting the planar portion 102 mainly moves in a direction perpendicular to the surface of the panel member, restricting the movement toward radially outward. That is, since the annular lip portion 32 is extending in entirety in a direction perpendicular to the surface of the panel member 100, when the annular lip portion 32 elastically contacts the planar portion 102, the annular lip portion 32 is compressed and deformed in the direction perpendicular to the surface of the panel member. At this time, the protruding portion 323 moves radially inward. Since the protruding portion 323 is formed into a curved face, the contact state shifts from the state in which the tip end of the protruding portion 323 is in contact with the planar portion 102 to the state in which a portion of the protruding portion 323 located radially inward than the tip end is in contact with the planar portion 102, in accordance with the above-mentioned deformation. At this time, the point of contact of the planar portion 102 with the protruding portion 323 remains substantially constant, and at least the protruding portion 323 is not moved radially outward (i.e., the point of contact does not move radially outward).

The embodiment of the present invention described so far may provide the following advantageous effects. That is, as described above the annular lip portion 32 has the compression direction corresponding to the direction perpendicular to the plane of the panel member 100. Thus, even if the annular lip portion 32 is formed with large length to ensure the adequate large pushing force with respect to the planar portion 102, the tip edge of the annular lip portion 32 is unlikely to be located in the vicinity of the outer edge of the first flange portion 31. This avoids the contact between the annular lip portion 32 and the other members, thereby preventing unintended deformation of the annular lip portion 32.

Further, as described above, the annular lip portion 32 has the compression direction corresponding to the direction perpendicular to the plane of the panel member. Thus, as compared with the case of the use of an annular lip portion which deforms so as to spread radially outward, the large pushing force can be obtained and thus the reliable water tightness can be obtained, even if the distance (i.e., deformation stroke of the annular lip portion 32) that the attachment section 3 moves with respect to the panel member 100, from when the annular lip portion 32 starts abutting on the planar portion 102 until when the engaging portion 203 is engaged with the panel member 100, is short. During the attachment of the attachment section 3 to the panel member 100, the shorter the deformation stroke of the annular lip portion 32, the shorter the time that an operator feels the response. Thus, by shortening the deformation stroke of the annular lip portion 32, the operator can feel the change in the response the engaging portion 203 is attached to the panel member 100, thereby improving workability.

Further, as described above, the radially outward movement of the point of contact on the planar portion 102 with the flange protrusion 324 is prevented during the elastic contact of the annular lip portion 32 with the planar portion 102. Thus, an area of plane (a required plane) on the panel member 100 can be reduced. In order to ensure the water tightness by the annular lip portion, the portion of the panel member on which the annular lip portion would contact needs to be plane. Thus, since the point of contact on the planar portion 102 with the flange protrusion 324 does not move radially outward, only the limited area (limited range) of the panel member needs to be plane.

By proving the plurality of ribs 36 that connect the annular lip portion 32 and the first flange portion 31, the pushing force of the annular lip portion 32 against the planar portion 102 can be increased. The pushing force can be easily adjusted by suitably adjusting the number of ribs 36.

The present invention includes but is not limited by the embodiments described herein. The scope of the present invention may further encompass other technical aspects, including modifications described below.

For example, in the embodiment described above, the point of contact of the planar portion 102 with the flange protrusion 324 is prevented from moving radially outward during the elastic contact of the annular lip portion 32 with the planar portion 102. However, the point of contact of the planar portion 102 with the flange protrusion 324 may slightly move in the direction radially outward during the elastic contact, as long as the compression direction of the annular lip portion is substantially coincident with the direction perpendicular to the plane of the panel member.

Further, in the embodiment described above, the annular lip portion 32 has the tubular portion 321 and the second flange portion 322 and is arranged to deform in the compression direction corresponding to the direction perpendicular to the plane of the panel member. However, the annular lip portion may be formed into other shapes that can deform in the compression direction corresponding to the direction perpendicular to the plane of the panel member. For example, the annular lip portion may solely consist of a tubular portion, in which case a tip edge of the tubular portion may contact with the planar portion. In this case, a portion of the tubular portion may be reduced in thickness or formed into bellows to facilitate deformability so that the tubular portion can deform in the compression direction corresponding to the direction perpendicular to the plane of the panel member.

Furthermore, in the embodiment described above, the annular lip portion 32 and the first flange portion 31 are connected to each other with the plurality of ribs 36. However, the number of rib 36 may be selected arbitrarily, and only one rib 36 may be provided. Further, the rib may be provided only when needed, that is, it is not necessary to provide the rib if the sufficient pushing force can be obtained by forming the annular lip portion with increased thickness or with resin having less deformability.

The present invention is not limited to the technical means and features described thus far and may include any other possible technical aspects within the scope of the present invention. The embodiment of the present invention was described herein by way of example in all aspects and should not be construed as limiting the scope of the present invention. The scope of the present invention is intended to include various modifications made by those skilled in the art concerning shapes, materials, quantities, and any other specifics without departing from the technical idea and spirit of the present invention. Any shapes, materials, and/or specifics described herein are not intended to limit the scope of the present invention but are only illustrated by way of example, so that the present invention is better and more clearly understood. The scope of the present invention includes all of the structural elements and their names described herein with or without limitations, in whole or in part, on materials, shapes, and so forth.

REFERENCE SIGNS LIST 1 grommet
10 grommet body
31 first flange portion
32 annular lip portion
321 tubular portion
322 second flange portion
34 second bending portion
36 rib
100 panel member
101 attachment hole
102 planar portion
200 inner member
203 engaging portion

What is claimed is:

1. A grommet formed into a tubular shape so as to cover an electric wire and configured to be attached to an attachment hole of a panel member, the grommet comprising:
   a first flange portion formed so as to face the panel member; and
   an annular lip portion extending from an inner peripheral part of the first flange portion toward the panel member so as to elastically contact with a planar portion around the attachment hole,
   wherein the annular lip portion extends in entirety in a direction perpendicular to a plane of the panel member so as to deform in a compression direction corresponding to the direction perpendicular to the plane of the panel member during the elastic contact, such that a location on the panel member contacting the annular lip portion is prevented from moving outwardly in a radial direction of the annular lip portion.

2. The grommet according to claim 1, further comprising:
   a grommet body including the first flange portion and the annular lip portion; and
   an inner member to be attached to the grommet body,
   wherein the inner member is configured to be inserted in the attachment hole, and includes an engaging portion that engages with a surface of the panel member on a side opposite to the grommet body.

3. The grommet according to claim 1, wherein
   the annular lip portion comprises:
   a tubular portion extending from the first flange portion toward the panel member; and
   a second flange portion continuous with an end of the tubular portion and extending radially outward,
   wherein a bending portion provided between the tubular portion and the second flange portion is deformed during the elastic contact.

4. The grommet according to claim 2, wherein
   the annular lip portion comprises:
   a tubular portion extending from the first flange portion toward the panel member; and
   a second flange portion continuous with an end of the tubular portion and extending radially outward,
   wherein a bending portion provided between the tubular portion and the second flange portion is deformed during the elastic contact.

5. The grommet according to claim 1, further comprising one or more ribs connecting the annular lip portion and the first flange portion.

6. The grommet according to claim 2, further comprising one or more ribs connecting the annular lip portion and the first flange portion.

7. The grommet according to claim 3, further comprising one or more ribs connecting the annular lip portion and the first flange portion.

8. The grommet according to claim 4, further comprising one or more ribs connecting the annular lip portion and the first flange portion.

* * * * *